US 6,682,437 B2

(12) United States Patent
Killion et al.

(10) Patent No.: US 6,682,437 B2
(45) Date of Patent: Jan. 27, 2004

(54) STATIC UNBALANCE-TYPE BALANCE SHAFTS WITH AXIS ALIGNMENT PRESERVATION

(75) Inventors: David Killion, Clarkston, MI (US); Allen Hale, Plymouth, MI (US)

(73) Assignee: Metaldyne Machining and Assembly Company, Inc., Plymouth, MI (US)

( * ) Notice: Subject to any disclaimer, the term of this patent is extended or adjusted under 35 U.S.C. 154(b) by 0 days.

(21) Appl. No.: 10/047,487

(22) Filed: Jan. 14, 2002

(65) Prior Publication Data

US 2003/0013534 A1 Jan. 16, 2003

Related U.S. Application Data

(60) Provisional application No. 60/261,443, filed on Jan. 13, 2001.

(51) Int. Cl.[7] .............................. F16C 3/20; F02B 75/06
(52) U.S. Cl. ...................... 464/185; 123/192.2; 74/603
(58) Field of Search .................. 464/180, 185; 123/192.1, 192.2; 74/603, 604, 570, 573 R

(56) References Cited

U.S. PATENT DOCUMENTS

| | | | | | |
|---|---|---|---|---|---|
| 1,658,979 A | * | 2/1928 | Fisher | ...................... | 184/6.28 |
| 4,617,885 A | * | 10/1986 | Oshiro et al. | ............. | 123/192.2 |
| 4,658,777 A | * | 4/1987 | Suzuki | ..................... | 123/192.2 |
| 5,875,753 A | * | 3/1999 | Ishikawa | ................. | 123/192.2 |
| 6,237,442 B1 | * | 5/2001 | Killion | ......................... | 74/603 |
| 6,397,809 B1 | * | 6/2002 | Sayama et al. | .......... | 123/192.2 |
| 6,405,702 B2 | * | 6/2002 | Takano et al. | ........... | 123/192.2 |

* cited by examiner

Primary Examiner—Lynne H. Browne
Assistant Examiner—Kenn Thompson
(74) Attorney, Agent, or Firm—McDonald Hopkins Co., LPA

(57) ABSTRACT

A static unbalance-type balance shaft for canceling unbalance forces of an engine includes a principal bearing journal located adjacent a first end of the shaft and an outrigger bearing journal located adjacent the second end of the shaft. A first counterweight is positioned adjacent one side of the principal journal and a second counterweight is positioned on the other side of the principal journal. The balance shaft has a small third outrigger counterweight or other source of unbalance positioned adjacent the outrigger journal for maintenance of the shaft's Effective Plane of Static Unbalance within the length of the principal journal while allowing the composite center of gravity of the first and second counterweights to be shifted away from the outrigger unbalance, for the purpose of improving the stability of shaft operating shape at the outrigger journal end of the shaft across the entire range of operating speeds.

35 Claims, 5 Drawing Sheets

STATIC UNBALANCE-TYPE BALANCE SHAFTS WITH AXIS ALIGNMENT PRESERVATION

CROSS-REFERENCE TO RELATED APPLICATIONS

The present application claims priority from U.S. Provisional Application Serial No. 60/261,443, filed Jan. 13, 2001, and entitled "Static Unbalance-Type Balance Shafts Having Axis Alignment Preserved To High Rotational Speeds."

TECHNICAL FIELD

The present invention relates to balance mechanisms for rotating machinery, particularly balance shafts for multi-cylinder internal combustion engines which exhibit vertical shaking forces.

BACKGROUND ART

Balance shafts are commonly used to reduce or cancel shaking forces and/or vibrations which result from residual imbalances inherent in the design architecture of machinery with rotating and/or reciprocating parts, or mechanisms, such as motors. These balance shafts are sometimes called "counterbalance" shafts.

Balance shafts are particularly valuable when operator or passenger comfort and freedom from noise and vibration related fatigue or distraction are desired, as in the case of motor vehicles such as automobiles, motorcycles, and the like. It is also advantageous to minimize vibration from the standpoint of equipment reliability. Where vibrations are reduced, the size, mass, and/or complexity of the mounting structures can often be reliably reduced, thus potentially reducing costs.

With multi-cylinder motor vehicle engines, the inline four-cylinder engine configuration is favored in much of automotive and industrial use today due to its inherent packaging space, manufacturing cost, and fuel consumption efficiencies. These engines benefit from Lanchester-type balance shafts, which can cancel nearly all of the inherent twice-per-revolution shaking forces produced by this otherwise mass-balanced architecture.

Lanchester-type balance shafts for these inline four-cylinder engines are paired to rotate in opposite directions at twice engine speed. The two balance shafts are timed to cancel each other's lateral forces while opposing the vertical "secondary shaking forces" that result from connecting rod tilt, causing piston motion to depart from sinusoidal or "simple harmonic" motion in the midstroke region centered about 90 degrees before and after "top dead center." Each shaft produces a single, or "static" rotating unbalanced or centrifugal force, which taken together with its mating shaft's rotating unbalanced force, produces a resultant vertical shaking force which most effectively is located centrally among the bank of cylinders so as to be coincident with the engine's resultant shaking force. Static unbalance-type shafts of this general type are shown, for example, in U.S. Pat. No. 5,857,388.

Helical gears are often employed as the means of maintaining orientation "timing" between Lanchester-type balance shafts because of their potential to represent the best value choice for engineering priorities such as durability, wear resistance, noise emissions, cost, packageability, mass, power consumption and the like. This potential, especially in the often critical case of noise emissions, is highly dependent upon actualization of the gearset's theoretically possible total contact ratio (TCR). This, in turn, is much more highly dependent upon freedom from axial misalignment of gear tooth geometries, i.e., gear tilting or twisting with respect to its mate, throughout the operating speed range, than are alternative timing drive means such as chains or toothed belts.

Additionally, it is often advantageous to use a driven balance shaft to drive another component, such as an oil pump, as taught in U.S. Pat. No. 5,918,573 entitled "Energy Efficient Fluid Pump," to provide a synergistic noise control benefit. In this case, also, the stability of the driving means' axis alignment throughout all operating speeds can play a critical role with regards to many of the same engineering priorities mentioned earlier. Given the elastic compliance inherent to structural materials, operating shape changes will accompany the load changes that occur as a balance shaft is operated at various speeds. Adding material to increase the section modulus of structural members, such as connector portions of balance shafts, carries a mass (and often cost) penalty, and can carry a fuel consumption penalty and/or packaging space penalty as well, and yet can still not succeed in providing for engineering target value axis alignment control.

Accordingly, there exists an advantage in the ability to achieve targeted axis alignment control for balance shaft drive means such as gears and extensions throughout the operating speed range without incurring additional mass, cost, fuel consumption or packaging space penalty.

With these motivations in mind, an example of a typical balance shaft for an inline four-cylinder engine is shown in a purely static condition in FIG. 3. This prior art balance shaft 10 includes counterweights 12, 14 located adjacent to either side of (or "straddling") the principal balance shaft journal 16 so as to apply their composite centrifugal loading to the journal bearing 16, thus transmitting the centrifugal loads to the engine's structure. This arrangement, with the diameter of the bearing journal being smaller than the effective diameter of the counterweight (as defined by the locus of the counterweight's largest effective radius as the shaft rotates), represents the combination of power-consuming bearing friction and space-consuming unbalance mass best able to maximize fuel consumption, mass, and packaging space efficiencies in most cases. The bending stiffness of the ideally sized journal is typically lower, however, than that of a larger diameter, suboptimal (in terms of friction and heat generation) journal configurations. Journal bending stiffness typically plays a significant role in operating shape stability versus operating speed, yet can be utilized to advantage without penalty using the inventive strategy disclosed herein.

Referring to FIG. 4, which illustrates the balance shaft 10 with high speed operating shape that is greatly exaggerated for clarity, the counterweights 12, 14 of this prior art configuration are "balanced," in terms of their bending moments, the product of their respective centrifugal force magnitudes and locations, about the midpoint of the length of the principal journal 16 such that their composite resultant force is located at the midpoint 18 of the journal 16 when the shaft 10 is spun about its axis of rotation $C_L$, 30. By locating the composite resultant force at the journal midpoint 18 in this fashion, the balance shaft's output loads are typically located at the midpoint of the engine's cylinder array, which is typically the midpoint of its central bulkhead's axial length. This is accomplished by distributing the counterweight masses such that their "moments" of unbalance sum to zero at the midpoint 18 of the journal 16, which is the targeted Effective Plane of Static Unbalance ("EPSUB") location. This is discussed in more detail in U.S. Pat. No. 6,237,442, entitled "High Value Static Unbalance-Type Balance Shafts."

In other words, the product of unbalance magnitude and its effective distance from the EPSUB is the same for each counterweight 12, 14, with the "effective distance" being measured from the center of gravity (CG) of each unbalance mass, respectively. These opposingly "balanced" bending moments act to bend the shaft structure principally in the region of the principal journal 16, tending to deflect both ends of the shaft 10 away from its axis of rotation $C_L$, 30 toward the CGs of the unbalance masses at elevated rotational speeds. The end result of this bending acts to result in a tilt, or "wobble" (lateral runout) of the drive gears 20, 22 whose quiet operation depends heavily on axis alignment with respect to each other, i.e., the avoidance of such tilt. This unwanted gear tilt is generally represented by reference number 38.

The mechanism which results in this tilt is an axial shift in the effective plane of support to the principal journal 16 provided by the sleeve bearing's oil film, as generally indicated by reference number 24. This axial shift is a result of any tilting, or misalignment (e.g., due to high speed bending), of the principal journal 16 with respect to its bearing sleeve. Since the balance shaft's other "outrigger" bearing 26 resists motion away from the axis of rotation $C_L$, 30, most of this high speed bending about the principal journal 16 is manifested in radial deflection of the shaft's overhung end 28, as generally indicated by reference number 36.

This deflection of the overhung end 28 tends to cause "edge loading" of the bearing sleeve due to the tilting of the principal journal 16, which thereby shifts the oil film's effective "center of pressure" or OFCOP 24 towards the overhung end 28 where the oil film is hydrodynamically driven or "wedged," into the smallest gap, or "minimum film thickness." With this oil film "center of pressure" 24 acting as the effective fulcrum where loads concentrate, its relocation towards the overhung end 28 results in the "cradled" (between bearings) counterweight 12 having a greater unbalance moment about this fulcrum than the overhung counterweight 14, causing residual loading to be borne by the outrigger bearing 26. This increased moment, resisted by the residual loading on the outrigger journal 26, acts to bend the shaft or connector portion 32, which extends between the bearings 16, 26. The shaft 10 bends during operation in somewhat catenary-appearing fashion, thus tilting the axis of an originally true-running gear 20 mounted adjacent to the outrigger bearing 26 as the shaft's static centerline 34 deforms from its unloaded straightness, as evidenced by the angle represented by reference number 36.

It is therefore desirable to provide a static unbalance-type balance shaft for a four-cylinder engine that provides operating shape stability versus operating speed for associated drive gears and/or shaft driven extensions without the addition of unnecessary mass or inertia. It is also desirable to provide a static unbalance-type balance shaft that avoids the requirement for indirect, or inefficient, structural load paths to the engine's cylinder block.

SUMMARY OF THE INVENTION

It is therefore an object of the present invention to provide static unbalance-type balance shafts for multi-cylinder internal combustion engines which maintain axis alignment of drive gears or drive extensions at all operating speeds such that the drive gears can be designed to operate with maximum performance and cost efficiency.

It is a further object of the present invention to provide static unbalance-type balance shafts with increased packageability, mass, inertia, and cost benefits.

It is another object of the present invention to enable static unbalance-type balance shafts with two efficiently sized journals to yield equivalent or superior gear axis alignment stability at elevated rotational speeds as compared to balance shafts having a larger number of journals.

It is yet a further object of the present invention to provide static unbalance-type balance shafts that equalize the unbalance moments about the desired Effective Plane of Static Unbalance with minimal overhung or cantilevered counterweight unbalance magnitude and thus minimal journal bending moment.

It is still another object of the present invention to provide a static unbalance-type balance shaft with improved operating shape stability versus rotational speed, for alignment of drive gears and/or extension shafts during rotation, without the need for additional mass to increase structural stiffness.

In accordance with the above and other objects of the present invention, a static unbalance-type balance shaft is provided. The balance shaft is intended to help cancel any unbalance force of an engine, particularly when driven and timed in mirror-fashion with a mating shaft, e.g. Lanchester. The balance shaft has an axis of rotation and includes a first bearing journal located adjacent a first end of the shaft. The balance shaft has a second bearing journal located adjacent a second end of the shaft. The first bearing journal has a first counterweight positioned adjacent one side thereof and a second counterweight positioned adjacent the other side thereof. The first counterweight and the second counterweight are offset from the balance shaft axis of rotation in the same direction. The balance shaft has a third counterweight located adjacent the second bearing journal. The third counterweight is smaller in unbalance magnitude than either the first or second counterweights.

Alternative but functionally equivalent structures include the substitution or supplementation of outrigger counterweight unbalance through the inclusion of deliberately unbalanced gears, the deliberate use of asymmetrical material located in the connector (or between counterweights) portion of the shaft, and/or the extension of the true running end of the inventive three-counterweight shaft for such considerable distance, such as to or through an adjacent engine bulkhead region wherein a third bearing journal may be needed to withstand radial loads from, e.g., drive chain means. In this latter case, the original "outrigger" journal (now the center of the three journals) would typically be retained to control gearset center distance, even if it were not required from the standpoint of gear tilt control.

These and other features and advantages of the present invention will become apparent from the following description of the invention when viewed in accordance with the accompanying drawings and appended claims.

BEST MODE(S) OF THE INVENTION

Figure 1:
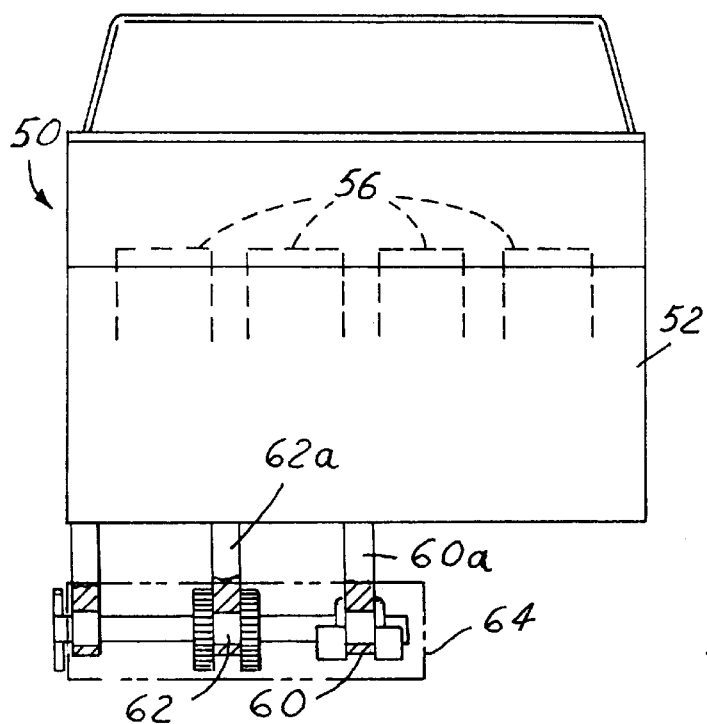
FIG. 1 is a side view of an inline four cylinder engine incorporating two static unbalance-type shafts.
Figure 2:
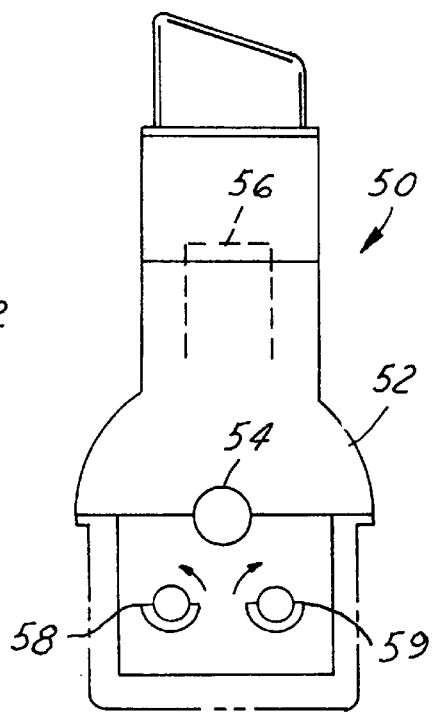
FIG. 2 is a front view of the engine shown in FIG. 1.
Figure 3:
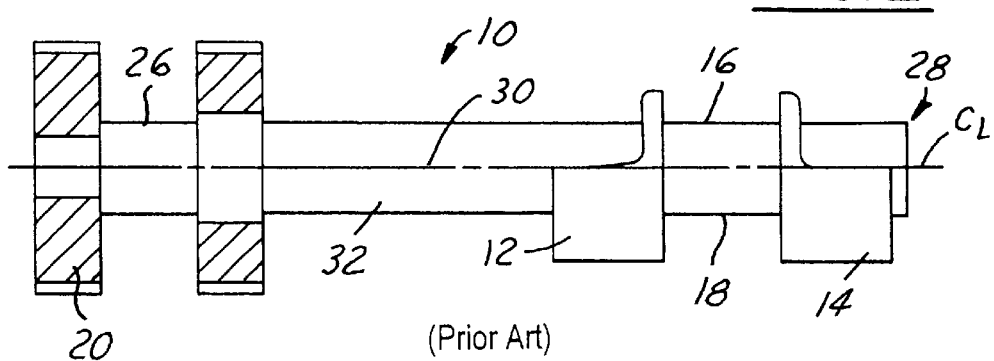
FIG. 3 is a schematic illustration of a prior art static unbalance-type balance shaft.

Preferred embodiments of the present invention are shown in the drawings. The present invention particularly relates to improved static unbalance-type balance shafts, which are shown in FIGS. 5 through 8. FIGS. 1 and 2 generally illustrate an inline four cylinder automobile engine 50. The engine 50 has an engine block 52 and a crankshaft 54 which is rotated by the rods connected to the pistons 56 in the engine 50. A pair of balance shafts 58, 59 are used to cancel shaking forces and/or vibration caused by the irregular movement of the reciprocating components in the engine 50, as is well known. The balance shafts 58, 59 are static unbalance-type balance shafts and each produces a single unbalanced force. The two balance shafts 58, 59 cancel each others' lateral shaking forces, while adding vertically to oppose the vertical secondary shaking forces that are caused by the engine 50.

Figure 9:
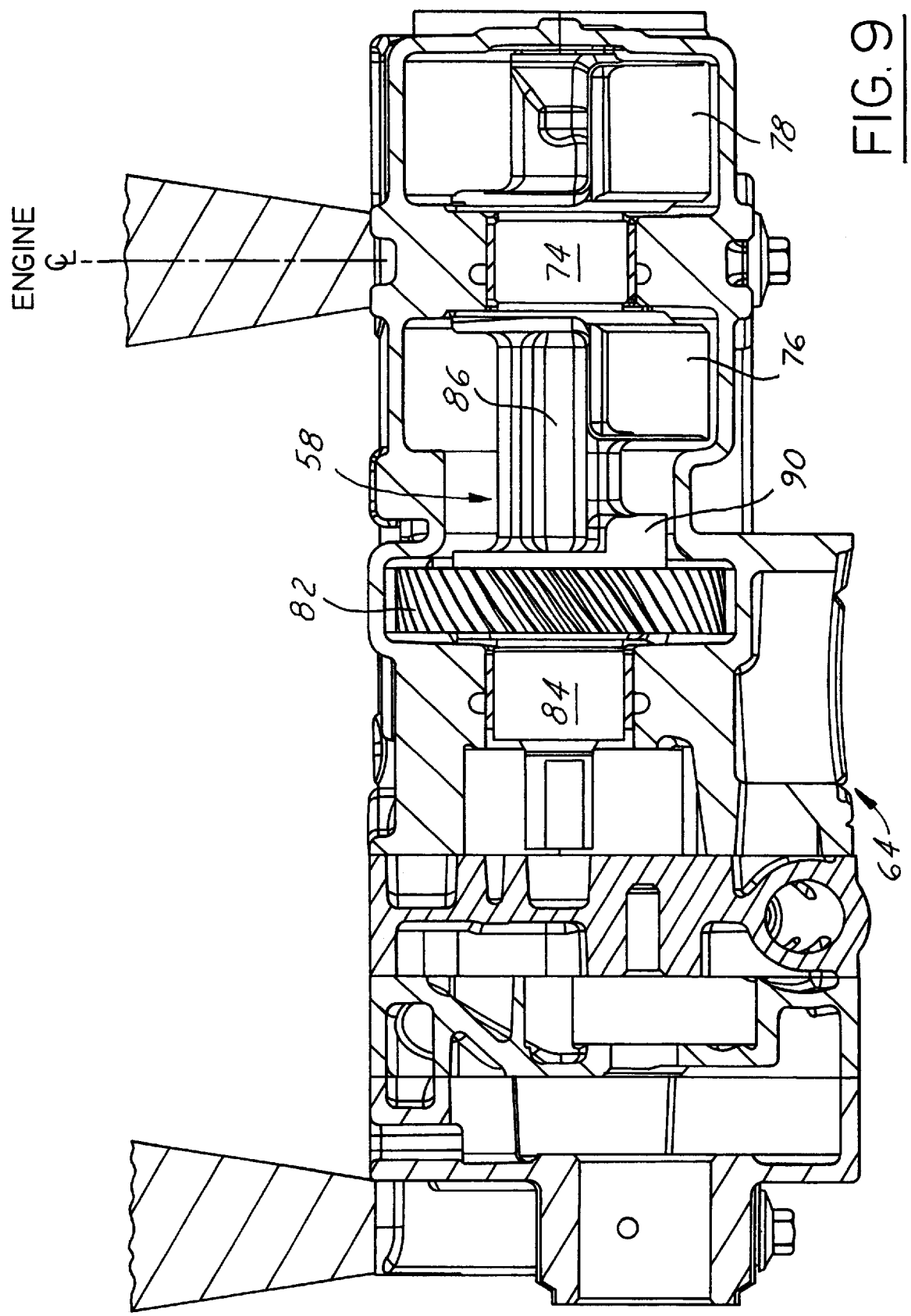
FIG. 9 is a cross-sectional view illustrating a static unbalance-type balance shaft in a housing in accordance with the present invention.
Figure 10:
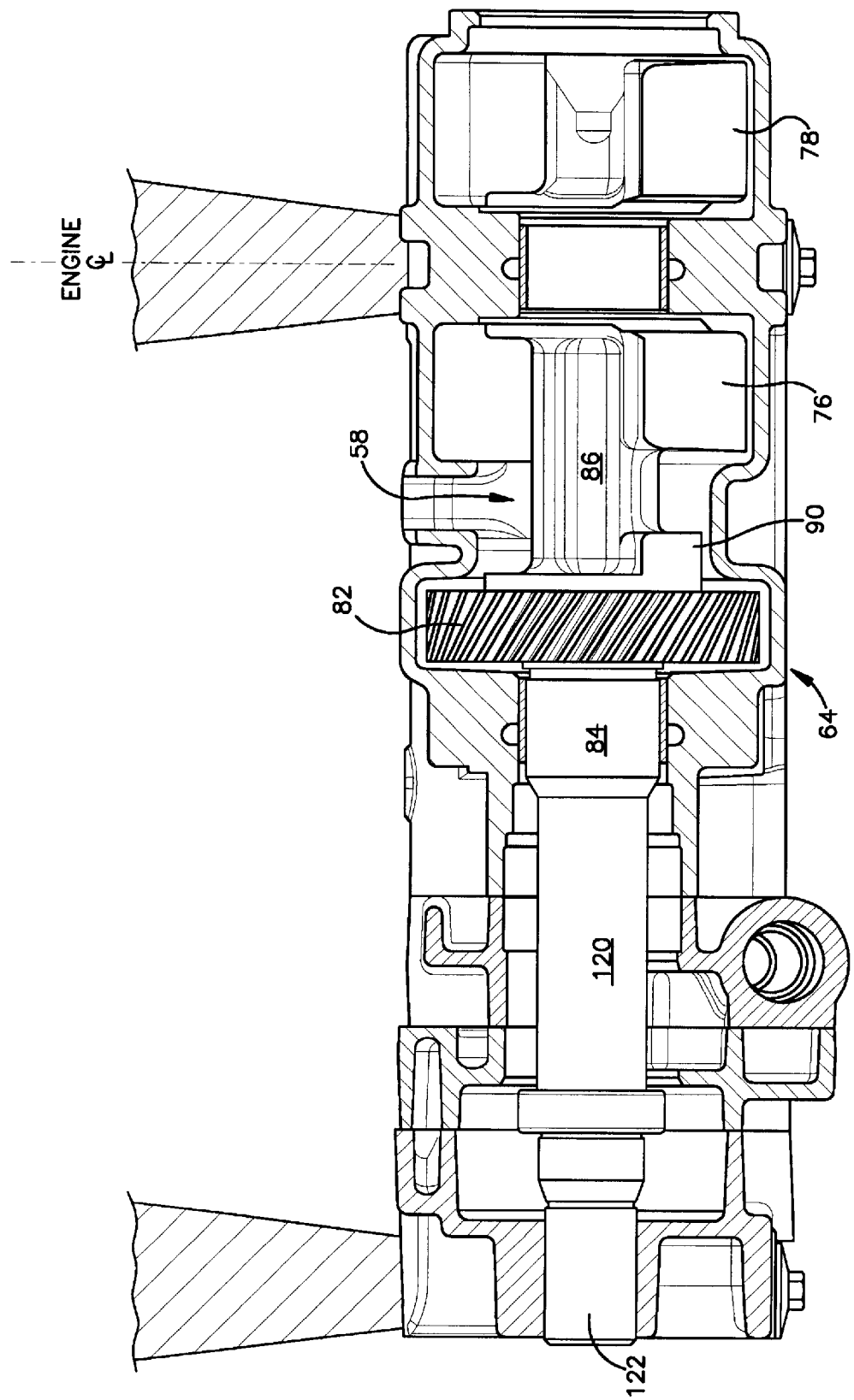
FIG. 10 is a cross-sectional view illustrating another embodiment of a static unbalance-type balance shaft in a housing in accordance with the present invention.

Each of the balance shafts 58, 59 is held in position by bearing journals 60, 62 formed thereon, which are held in position by bearing sleeves or bushings 60a, 62a respectively. Although the bearing location and bearing support for only one of the two balance shafts 58 are shown in FIG. 1, the second balance shaft 59 of the pair of balance shafts for the engine 50 is positioned and held in the same manner. It will be understood that the number and location of the bearing journals and thus the respective bearing sleeves will depend upon the desired application and is not to be construed as limiting. The engine 50 can also have a housing 64 attached thereto or integrally formed therewith, which surrounds the balance shafts 58, 59. With this configuration, the balance shafts 58, 59 in the housing 64 can act as an oil scavenging system to discharge oil from the housing, such as is disclosed in U.S. Pat. No. 6,170,453, which is hereby incorporated by reference. Examples of such housings are shown in FIGS. 9 and 10.

It will be understood by one of skill in the art that the present invention may be utilized with a variety of other vehicle engines or other applications, including both automotive and non-automotive. For example, two such balance shaft configurations could be arranged in end-to-end fashion to form a centrally-driven couple-type balance shaft for a V-6 engine.

Figure 5:
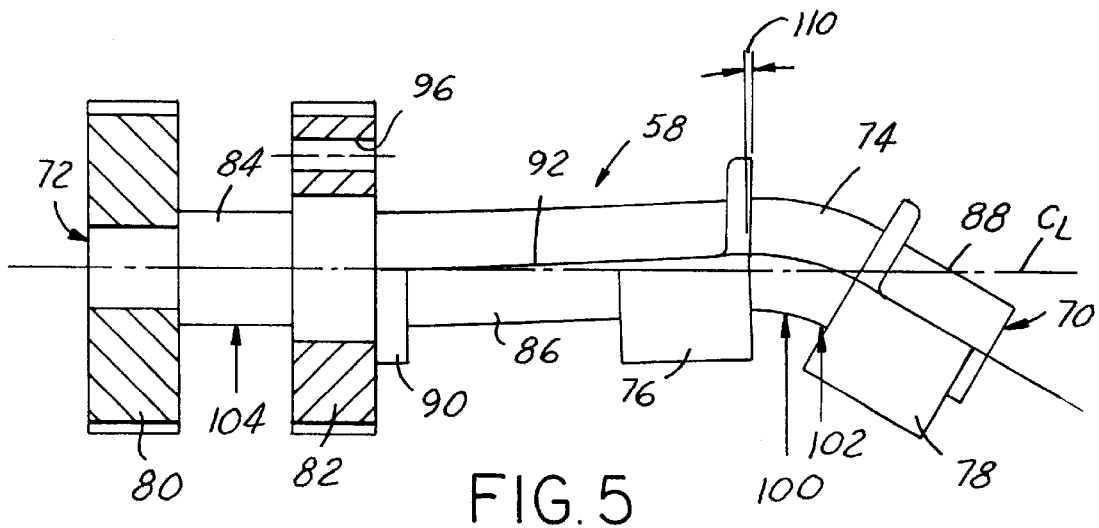
FIG. 5 is a schematic illustration of a static unbalance-type balance shaft with a high speed operating shape greatly exaggerated for clarity in accordance with a preferred embodiment of the present invention.
Figure 8:
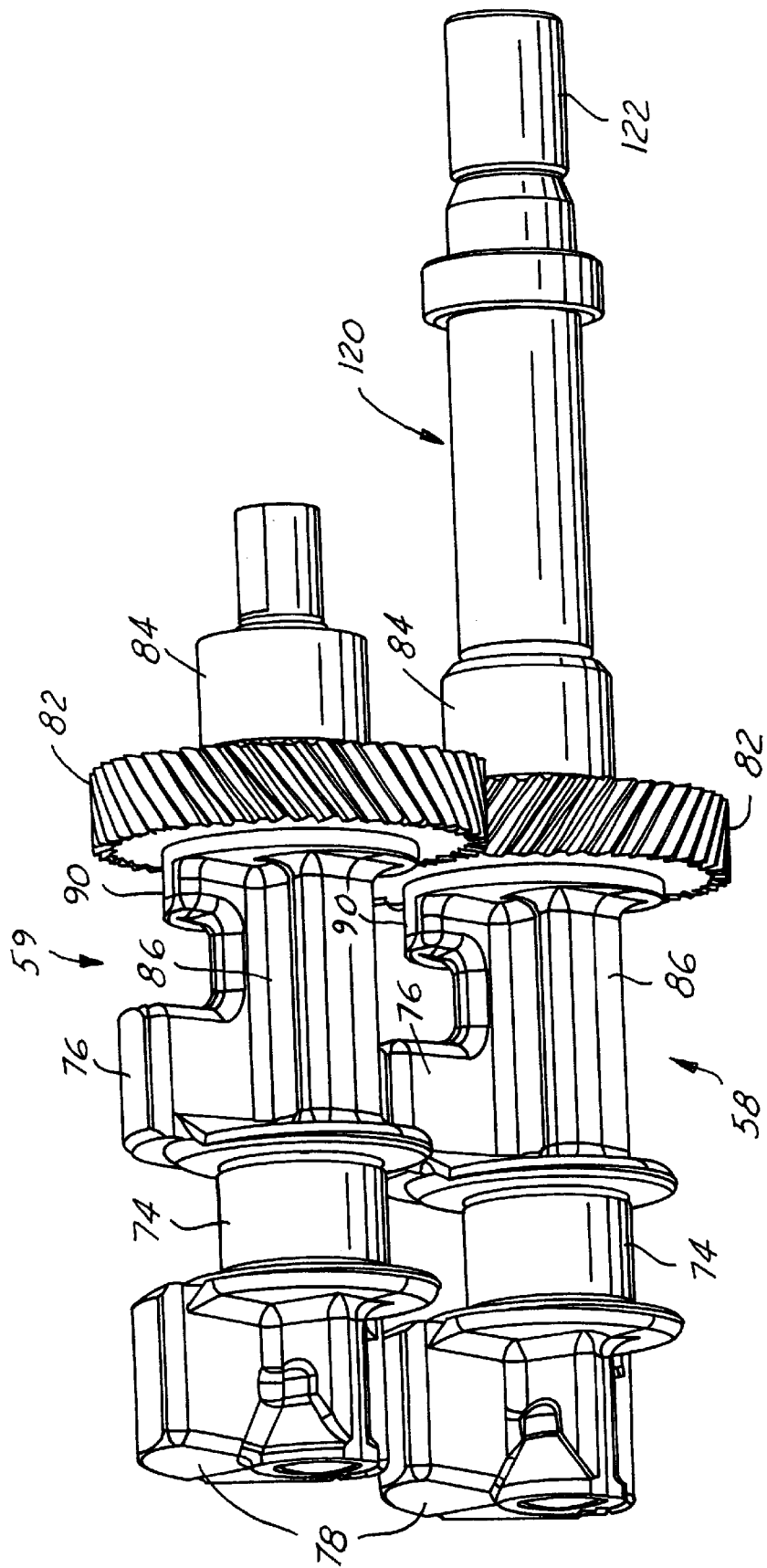
FIG. 8 is a top view of a pair of static unbalance-type balance shafts in mating relationship in accordance with a preferred embodiment of the present invention.

FIG. 5 illustrates a side view of one of the two static unbalance-type balance shafts 58 with a deformed high speed operating shape. It will be appreciated that the deformation of the shaft at high speeds is greatly exaggerated in FIG. 5 for purposes of illustration. In this embodiment, each of the balance shafts 58 has a first end 70 and a second end 72. The first end 70 of the shaft 58 has a first or principal bearing journal 74 located adjacent thereto. The principal bearing journal 74 has a first or cradled counterweight 76 located on one side and a second or overhung counterweight 78 located on the other side. The second end 72 of the shaft 58 has a drive means 80 and a drive gear 82 located adjacent thereto. The drive means 80 and the drive gear 82 are separated by an outrigger bearing journal 84 that is located therebetween. A connector portion 86 extends between the principal journal 74 and the drive gear 82. The balance shaft 58 has a static centerline 92, which at low speeds is substantially coincident with its axis of rotation 88. As shown in FIG. 8, the drive gear 82 is preferably a toothed gear, which meshes with a corresponding driven gear 83 on the second balance shaft 59 causing the second balance shaft 59 to rotate with and at the same speed as the first balance shaft 58.

In accordance with the present invention, significantly improved balance shaft packageability can be provided. Additionally, the cost benefits that are provided because of the use of two-journal shafts as opposed to multiple journal shafts are maintained. In addition to maintaining the aforementioned cost benefits, the disclosed two journal shafts provide gear axis alignment benefits that are equal or superior to those present with shafts having a large number of journals. These benefits are accomplished through the inclusion of an outrigger counterweight 90 and/or gear unbalance created by hole 96 or other form of unbalance-creating material void, hereafter referred to as "outrigger unbalance," located remotely from the first end 70 of the balance shaft 58.

The outrigger unbalance, such as due to the outrigger counterweight 90, is preferably of smaller unbalance magnitude than both the first counterweight 76 and the second counterweight 78 and is preferably located substantially adjacent to the outrigger journal 84. The outrigger counterweight 90 and/or unbalance in drive gear 82 is designed with unbalance magnitude subtracted from the sum of the unbalance magnitudes of the two counterweights 76, 78 in such a way as to preserve the desired total or composite unbalance, and the desired location of the Effective Plane of Static Unbalance ("EPSUB"), which is the location where all the moments of unbalance sum to zero, as generally represented by reference number 100. Put another way, the EPSUE is the location along the axis of rotation where dynamic, or rotating couple, imbalance is absent. The EPSUB is preferably located within the working length of the first bearing journal 16's outer or major diameter, and more preferably is located at the midpoint 18 of the first bearing journal 16. The location of the outrigger counterweight 90, unbalance in drive gear 82 and/or other outrigger unbalance will depend on a variety of factors, including packaging architecture and the number of gears or other features needing high speed axis alignment control, as will be appreciated by one of skill in the art.

As shown in FIG. 5, the outrigger counterweight 90 and the unbalance in drive gear 82 are located inwardly (toward the middle of the shaft) from the outrigger journal 84. The outrigger unbalance is thus located between the outrigger journal 84 and the principal journal 74. This "internal" location of the outrigger unbalance acts to align the deformed static centerline (also referred to as "DSC") 92 of the outrigger journal 84 in conjunction with a small residual outrigger bearing reaction force, as generally represented by vector 104. Alternatively, instead of the outrigger unbalance being created by both the outrigger counterweight 90 and the unbalance in the drive gear 82, the outrigger unbalance can be created by only one of either the outrigger counterweight 90 or the unbalance in the drive gear 82.

The magnitude of the outrigger bearing reaction force 104 sums with principal journal 74's bearing reaction force acting at the oil film center of pressure 102 to equal the total shaft composite unbalance force acting at the EPSUB location 100, thus serving to "balance," unbalance moment-wise, the axial offset of the center of pressure 102 from the EPSUB 100 with its considerably greater lever arm. The ideally small magnitude of the outrigger bearing reaction force 104 serves to provide final correction to the deformed static centerline 92's coincidence with the axis of rotation 88 at the functionally critical gear 82—mounting end of the shaft by "bending" this end 72 of the shaft's slightly elevated static centerline 92 back to parallelism with the axis of rotation 88 by means of the small bending moment formed between it and the center of gravity of the outrigger unbalance whether due to the counterweight 90 or the hole in the gear 96, or other unbalance creating asymmetry employed.

The magnitude of the outrigger reaction force 104 is ideally minimal due to the relative magnitudes of the first counterweight's unbalance 76 and the second counterweight's unbalance 78, along with the axial locations of their centers of gravity, which are ideally engineered to very slightly elevate the deformed static centerline 92 in the region of the counterweight 76 (in conjunction with a slightly positive angle 110), such that deformed static centerline 92 is substantially parallel to, and minimally "elevated" with respect to axis of rotation 88, a condition wherein the principal journal counterweights 76 and 78 are proportioned such that when taken by themselves (disregarding outrigger unbalance), the overhung counterweight 78 enjoys marginal moment-of-unbalance advantage over cradled counterweight 76 when "balanced" about the maximum-speed location of the relocated oil film center of pressure 102. This nearly balanced state minimizes outrigger bearing reaction force 104 and thus minimizes the misalignment between the deformed static centerline 92 and the axis of rotation 88 on the outrigger journal side of principal journal 74, as represented by angle 110.

The deformed static centerline of the balance shaft 58 of FIG. 5 at high speeds, is generally indicated by reference number 92. As discussed above, the deformation of the balance shaft static centerline 92 at high speeds has been greatly exaggerated for purposes of illustration. As also shown, the first counterweight 76, the second counterweight 78, and the third counterweight 90, and where applicable, gear unbalance, as generally represented by the hole 96, are all offset from the axis of rotation 88 in the same direction.

Figure 6:
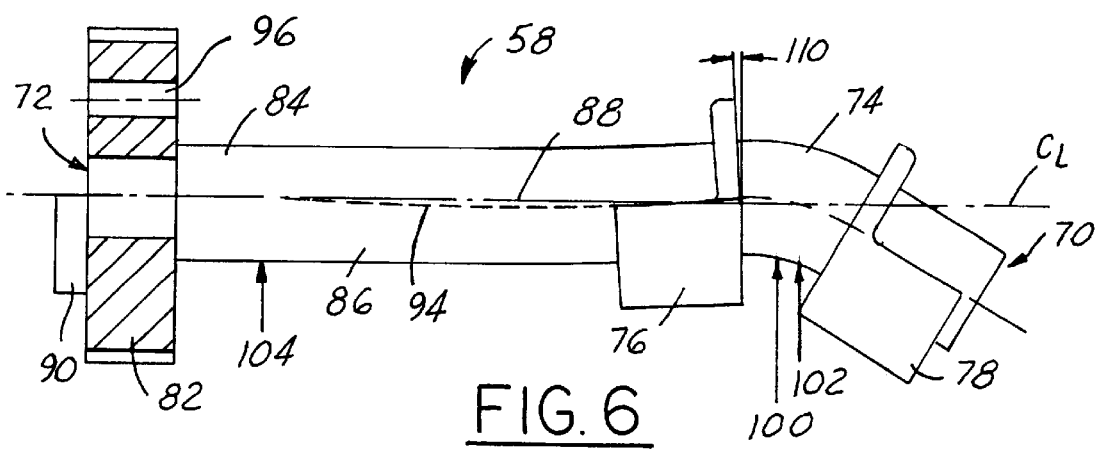
FIG. 6 is a schematic illustration of another embodiment of a static unbalance-type balance shaft with a high speed operating shape greatly exaggerated for clarity in accordance with the present invention.

FIG. 6 illustrates another embodiment of a static unbalance type balance shaft 58 in accordance with the present invention. In this embodiment, the balance shaft has only a single drive gear 82. The connector portion 86 thus extends between the principal journal 74 and the outrigger journal 84. The drive gear 82 is located outwardly from the outrigger journal 84, i.e., closer to the second end 72 of the shaft 58. In this embodiment, the outrigger unbalance, from the outrigger counterweight 90 and the gear unbalance 96 is located "externally" to the outrigger journal 84. In other words, the outrigger unbalance is located between the outrigger journal 84 and the second end 72 of the shaft 58. In this "external" configuration, the outrigger unbalance acts to straighten the axis of rotation of the overhung end 70 of the shaft 58 from slight residual "catenary" bending between the journals 74, 84 in conjunction with the outrigger bearing reaction force 104 acting on the outrigger journal 84.

The same general principles as discussed above apply to this "external" outrigger unbalance case (FIG. 6), except for the local principal counterweight moment of unbalance advantage about the maximum speed oil film center of pressure 102 favoring the cradled counterweight 76 such that the final deformed static centerline 94 correction bending moment direction is reversed to resolve the slightly catenary deformed static centerline. The deformed static centerline 94 of the balance shaft 58 of FIG. 6 at high speeds is generally indicated by reference number 94. The deformation of the balance shaft of FIG. 6 is similarly exaggerated for illustration purposes. Moreover, the first, second, and third counterweights 76, 78, 90, and where applicable, gear unbalance, as generally represented by the hole 96, are all offset from the axis of rotation 88 in the same direction.

It will be understood that the outrigger unbalance can be created by a variety of different ways, including shaft connector asymmetry, connector portion asymmetry, counter weighting, unbalanced gears, and/or unbalanced drive means.

The principal benefit of the outrigger unbalance is its ability to equalize, or balance, the unbalance moments about the desired EPSUB location 100 with minimal unbalance magnitude. This minimality is due to the great leverage about the oil film center of pressure, as generally indicated by reference number 102, afforded by the remote location of the outrigger counterweight 90. The two principal counterweights 76, 78 adjacent to the principal journal 74 are ideally "balanced," unbalance moment-wise, about the principal bearing's maximum speed oil film center of pressure. The balancing is accomplished in such a way that the deformed static centerline 92 in the vicinity of the cradled counterweight 76 is generally "elevated" (catenary sag reduced, eliminated, or reversed) versus centrifugal loading to a new, more neutral high speed posture (with respect to the axis of rotation 88) that promotes outrigger journal 84 and gear axis alignment. This is opposed to the usual role played by the cradled counterweight 12 of loading the outrigger journal 26 and thereby causing deformed static centerline and thus gear axis tilt.

The inclusion of the inventive third counter-weight 90, as well as other outrigger unbalance which is located remotely from the principal journal 74, is more optimal than simply extending the cradled counterweight 76 toward the outrigger bearing 84, while reducing the cross-sectional depth of the counterweight. This is because the thusly increased distance of the cradled counterweight's unbalance mass CG from the principal journal's center of pressure fulcrum point 102 would increase the magnitude of the bending moment on the principal journal 74 required to effect the local "anti-catenary elevation" needed for alignment of the deformed static centerline in the functionally critical region of outrigger journal 84 with respect to the axis of rotation 88.

The needlessly increased journal bending moment of this latter option increases the extent of edge loading of the principal journal 74's sleeve bearing in association with the increased radial deflection of the shaft overhung end 70. Edge loading of a sleeve bearing is a matter that can be tolerated to a degree by appropriate design, but must not be excessive in order to avoid risk of high speed bearing seizure. The inventive minimal, remote "outrigger" counterweight approach achieves the desired elevation or centering of the deformed static centerline 92 in the vicinity of the cradled counterweight 76, with resultant optimal high speed operating shape, with the "least necessary" bending/tilt/edge loading of the principal journal 74. This is accomplished in conjunction with an axially compact cradled counterweight 76 and the compliance of the connector portion 86 between the outrigger counterweight 90 and the cradled counterweight 76 by minimizing the magnitude of the unbalance moment of the overhung counterweight 78 (as required for elevation of the cradled counterweight 76), while maintaining the desired mid-journal location of the EPSUB 100.

Figure 7:
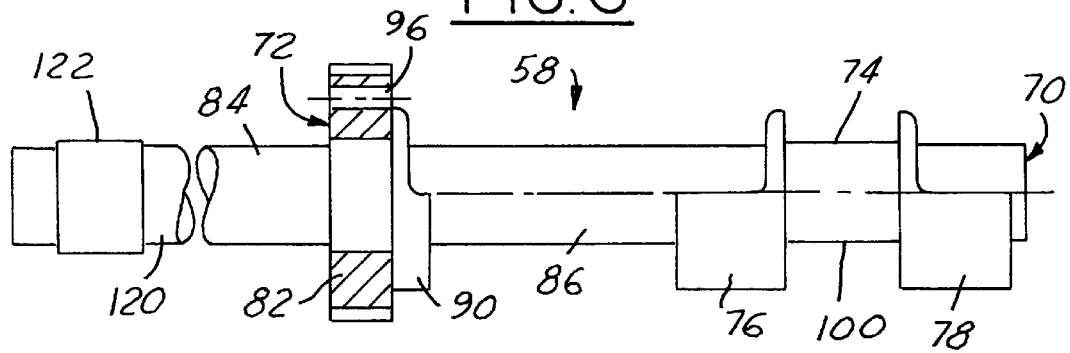
FIG. 7 is a schematic illustration of yet another embodiment of a static unbalance-type balance shaft in accordance with the present invention.
Figure 4:
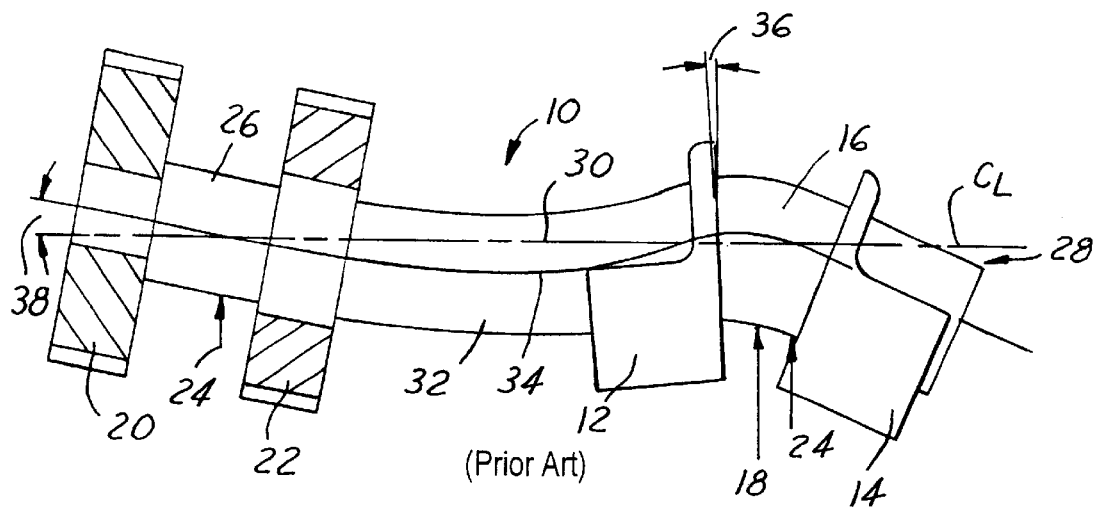
FIG. 4 is a schematic illustration of a prior art static unbalance-type balance shaft with high speed operating shape (deformed static centerline) greatly exaggerated for clarity.

Referring now to FIG. 7, which illustrates another embodiment of the present invention. FIG. 7 illustrates a balance shaft 58 similar to the balance shaft shown in FIG. 5. In other words, the balance shaft 58 of FIG. 7 has an "internal" configuration, wherein the outrigger unbalance, due to the third counterweight 90 and the gear unbalance, as generally represented by the hole 96, are located internally of the outrigger journal 84. As shown in FIG. 7, the outrigger counterweight unbalance can be supplemented through the inclusion of an extension portion 120. The extension portion 120 is an extension of the true running end of the disclosed three-counterweight balance shaft 58. The extension portion 120 extends for a considerable distance, such as to or through an adjacent bulkhead region wherein a third bearing journal 122 may be needed to withstand radial loads from, for example, a drive chain means. In this embodiment, the original "outrigger journal 84" is preferably retained to control gearset center distance, even if it were not required from the standpoint of gear tilt control. Moreover, a drive means is also preferably disposed on the extension portion 120 and is located outwardly, closer to the end of the extension, than the third bearing journal 122.

Other objects and features of the present invention will become apparent when reviewed in light of detailed description of the preferred embodiment when taken in conjunction with the attached drawings and appended claims.

What is claimed is:

1. A statically unbalanced balance shaft for canceling an unbalance force of an engine, the balance shaft having an axis of rotation, comprising:
    a first bearing journal located adjacent a first end of the shaft, said first bearing journal having a first end side and a second bearing journal side;
    a second bearing journal located adjacent a second end of the shaft, said second bearing journal having a second end side and a first bearing journal side;
    a first counterweight positioned adjacent said second bearing journal side of said first bearing journal and being offset from the axis of rotation in one direction;
    a second counterweight of greater unbalance moment magnitude about a midpoint of said first bearing journal than said first counterweight, said second counterweight positioned adjacent said first end side of said first bearing journal and being offset from the axis of rotation in the same direction as said first counterweight; and
    a third counterweight of unbalance magnitude less than said first counterweight located adjacent said second bearing journal, said third counterweight also being offset from the axis of rotation in the same direction as said first counterweight;
    wherein each of said first counterweight, said second counterweight, and said third counterweight and adjacent structural elements have combined center of gravities to produce a composite Effective Plane of Static Unbalance at a location substantially within the working length of an outer diameter of said first bearing journal.

2. The balance shaft of claim 1, wherein said third counterweight is located on said second end side of said second bearing journal.

3. The balance shaft of claim 1, wherein said third counterweight is located on said first bearing journal side of said second bearing journal.

4. The balance shaft of claim 1, wherein a portion of said unbalance magnitude of said third counterweight is located on said first bearing journal side of said second bearing journal and another portion of said unbalance magnitude of said third counterweight is located on said second end side of said second bearing journal.

5. The balance shaft of claim 1, further comprising:
    at least one drive gear on the shaft and located adjacent said second bearing journal.

6. The balance shaft of claim 5, wherein at least a portion of said third counterweight comprises unbalance integrated into said at least one drive gear.

7. The balance shaft of claim 6, wherein all of said third counterweight comprises unbalance integrated into said at least one drive gear.

8. The balance shaft of claim 4, wherein at least a portion of said third counterweight comprises unbalance integrated into said at least one drive gear.

9. The balance shaft of claim 8, wherein all of said third counterweight comprises unbalance integrated into said at least one drive gear.

10. The balance shaft of claim 3, wherein at least a portion of said third counterweight comprises unbalance integrated into at least one drive means.

11. The balance shaft of claim 10, wherein all of said third counterweight comprises unbalance integrated into said at least one drive means.

12. The balance shaft of claim 6, wherein at least a portion of said third counterweight comprises unbalance integrated into at least one drive means.

13. A statically unbalanced balance shaft for canceling an unbalance force of an engine, the balance shaft having an axis of rotation, comprising:
    a first bearing journal located adjacent a first end of the shaft and having a first end side and a second bearing journal side;
    a second bearing journal located adjacent a second end of the shaft and having a second end side and a first bearing journal side;
    a first counterweight positioned adjacent said second bearing journal side of said first bearing journal;
    a second counterweight of greater unbalance moment magnitude about a midpoint of said first bearing journal than that of said first counterweight, said second counterweight positioned adjacent said first end side of said first bearing journal;
    a third counterweight of unbalance magnitude less than that of said first counterweight; and
    an extension portion extending from said second end of the shaft, said extension portion having at least one drive means positioned thereon;
    wherein said first counterweight, said second counterweight, said third counterweight and said at least one drive means combine center of gravities to produce a composite Effective Plane of Static Unbalance at a location substantially within an outer diameter of said first bearing journal.

14. The balance shaft of claim 13, wherein said third counterweight is located on said second end side of said second bearing journal.

15. The balance shaft of claim 13, wherein said third counterweight is located on said first bearing journal side of said second bearing journal.

16. The balance shaft of claim 13, wherein a portion of said unbalance magnitude of said third counterweight is located on said first bearing journal side of said second bearing journal and another portion of said unbalance magnitude of said third counterweight is located on said second end side of said second journal.

17. The balance shaft of claim 13, further comprising:
at least one drive gear on the shaft which is located adjacent said second bearing journal.

18. The balance shaft of claim 17, wherein at least a portion of said third counterweight comprises unbalance integrated into said at least one drive gear.

19. The balance shaft of claim 18, wherein all of said third counterweight comprises unbalance integrated into said at least one drive gear.

20. The balance shaft of claim 16, wherein at least a portion of said third counterweight comprises unbalance integrated into said at least one drive gear.

21. The balance shaft of claim 20, wherein all of said third counterweight comprises unbalance integrated into said at least one drive gear.

22. The balance shaft of claim 15, wherein at least a portion of said third counterweight comprises unbalance integrated into said at least one drive means.

23. The balance shaft of claim 22, wherein all of said third counterweight comprises unbalance integrated into said at least one drive means.

24. The balance shaft of claim 18, wherein at least a portion of said third counterweight comprises unbalance integrated into said at least one drive means.

25. A statically unbalanced balance shaft for canceling an unbalance force of an engine, comprising:
a first counterweight positioned inwardly from a first end of the shaft;
a second counterweight positioned adjacent said first end of the shaft;
a principal bearing journal located between said first counterweight and said second counterweight, said second counterweight having a greater unbalance moment magnitude about said first bearing journal than said second counterweight;
an outrigger bearing journal located adjacent an outrigger end of the shaft; and
an outrigger unbalance located adjacent said outrigger bearing journal, said outrigger unbalance having an unbalance moment magnitude that is less than that of said first counterweight;
wherein said first counterweight, said second counterweight, and said outrigger unbalance combine center of gravities to produce a composite Effective Plane of Static Unbalance at a location substantially within the working length of an outer diameter of said principal bearing journal; and wherein said first counterweight, said second counterweight and said outrigger unbalance are offset from an axis of rotation of the shaft in the same direction.

26. The balance shaft of claim 25 wherein said outrigger unbalance comprises a third counterweight.

27. The balance shaft of claim 25, wherein said outrigger unbalance comprises unbalance integrated into at least one drive gear mounted on the balance shaft.

28. The balance shaft of claim 25, wherein said outrigger unbalance comprises unbalance integrated into at least one drive means mounted on the balance shaft.

29. The balance shaft of claim 25, wherein said outrigger unbalance comprises a third counterweight and unbalance integrated into at least one drive gear mounted on the balance shaft.

30. The balance shaft of claim 25, wherein said outrigger unbalance is located externally of said outrigger bearing journal.

31. The balance shaft of claim 25, wherein said outrigger unbalance is located internally of said outrigger bearing journal.

32. The balance shaft of claim 25, wherein a portion of said outrigger unbalance is located externally of said outrigger bearing journal and a portion of said outrigger unbalance is located internally of said outrigger bearing journal.

33. The balance shaft of claim 25, wherein said Effective Plane of Static Unbalance is located substantially at a midpoint of said principal bearing journal.

34. The balance shaft of claim 25, wherein said outrigger unbalance comprises any shaft asymmetry with respect to said axis of rotation.

35. A statically unbalanced shaft for cancelling an unbalanced force of an engine, the balance shaft having an axis of rotation, comprising:
a first bearing journal located adjacent a first end of the shaft, said first bearing journal having a first end side and a second bearing journal side;
a second bearing journal located adjacent a second end of the shaft, said second bearing journal having a second end side and a first bearing journal side;
a first counterweight positioned adjacent said second bearing journal side of said first bearing journal and being offset from the axis of rotation in one direction;
a second counterweight positioned adjacent said first end side of said first bearing journal and being offset from the axis of rotation in the same direction as said first counterweight; and
a third counterweight of unbalance magnitude less than said first counterweight located adjacent said second bearing journal, said third counterweight also being offset from the axis of rotation in the same direction as said first counterweight;
wherein each of said first counterweight, said second counterweight, and said third counterweight and any adjacent structural elements have combined center of gravities to produce a composite Effective Plane of Static Unbalance at a location substantially within the working length of an outer diameter of said first bearing journal.

* * * * *